US012524729B2

(12) United States Patent
Axelsson et al.

(10) Patent No.: US 12,524,729 B2
(45) Date of Patent: *Jan. 13, 2026

(54) SYSTEMS AND METHODS FOR QUALITY MONITORING OF PALLETS

(71) Applicant: Copeland Cold Chain LP, Kennesaw, GA (US)

(72) Inventors: Alexander Axelsson, Meridian, ID (US); Casimir E. Lawler, Jr., Boise, ID (US)

(73) Assignee: Copeland Cold Chain LP, Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/062,948

(22) Filed: Feb. 25, 2025

(65) Prior Publication Data

US 2025/0190925 A1     Jun. 12, 2025

Related U.S. Application Data

(63) Continuation of application No. 17/975,732, filed on Oct. 28, 2022, now Pat. No. 12,248,900.

(60) Provisional application No. 63/273,293, filed on Oct. 29, 2021.

(51) Int. Cl.
| | | |
|---|---|---|
| G06Q 10/0832 | (2023.01) | |
| G01K 11/12 | (2021.01) | |
| G05B 15/02 | (2006.01) | |

(52) U.S. Cl.
CPC ......... *G06Q 10/0832* (2013.01); *G01K 11/12* (2013.01); *G05B 15/02* (2013.01)

(58) Field of Classification Search
CPC ..... G06Q 10/0832; G01K 11/12; G05B 15/02
See application file for complete search history.

(56) References Cited

U.S. PATENT DOCUMENTS

| | | |
|---|---|---|
| 7,495,558 B2 | 2/2009 | Pope et al. |
| 8,306,871 B2 | 11/2012 | Farmer et al. |
| 8,407,103 B2 | 3/2013 | Farmer et al. |
| 9,087,333 B2 | 7/2015 | Kim et al. |
| 9,218,585 B2 | 12/2015 | Gupta et al. |
| 9,646,277 B2 | 5/2017 | Nemet et al. |
| 9,712,893 B2 | 7/2017 | Warkentin et al. |
| 9,965,939 B2 | 5/2018 | Nygren et al. |
| 10,309,945 B2 | 6/2019 | Mandava et al. |

(Continued)

FOREIGN PATENT DOCUMENTS

| | | |
|---|---|---|
| CN | 109002876 A | 12/2018 |
| CN | 109242065 A | 1/2019 |

(Continued)

OTHER PUBLICATIONS

Jeffrey D. Lindsay and Walter Reade, "Cascading RFID Tags," Dec. 23, 2003, The IP.com Journal. pp. 1-7. https://priorart.ip.com/IPCOM/000021112. (Year: 2003).*

(Continued)

*Primary Examiner* — Jeff Zimmerman
*Assistant Examiner* — Hunter Molnar
(74) *Attorney, Agent, or Firm* — Harness, Dickey & Pierce, P.L.C.; Anthony G. Fussner

(57) ABSTRACT

Exemplary embodiments are disclosed of systems and methods for quality monitoring of pallets of goods (e.g., fresh seafood, other perishable goods, nonperishable goods, etc.) in a cargo.

23 Claims, 17 Drawing Sheets

(56) References Cited

U.S. PATENT DOCUMENTS

| | | | |
|---|---|---|---|
| 10,339,619 B2 | 7/2019 | Muirhead | |
| 10,347,095 B2 | 7/2019 | Mattingly et al. | |
| 10,445,678 B2 | 10/2019 | Nemet et al. | |
| 10,467,444 B2 | 11/2019 | Burchell et al. | |
| 10,504,343 B2 | 12/2019 | Mattingly et al. | |
| 10,549,885 B2 | 2/2020 | de Bokx et al. | |
| 10,697,837 B2 | 6/2020 | Nemet et al. | |
| 10,726,375 B2 | 7/2020 | Nemet et al. | |
| 10,748,109 B2 | 8/2020 | Benjamin et al. | |
| 10,825,120 B2 | 11/2020 | Daigle et al. | |
| 10,853,760 B2 | 12/2020 | Feiner | |
| 10,885,412 B2 | 1/2021 | Masood et al. | |
| 10,943,206 B2 | 3/2021 | Maijala et al. | |
| 12,248,900 B2 * | 3/2025 | Axelsson | G01K 3/04 |
| 2011/0145162 A1 | 6/2011 | Vock et al. | |
| 2012/0158606 A1 | 6/2012 | Moudy | |
| 2015/0039528 A1 | 2/2015 | Minogue et al. | |
| 2016/0110683 A1 | 4/2016 | Gupta et al. | |
| 2016/0200930 A1 * | 7/2016 | Ribi | G01N 31/229 436/164 |
| 2016/0260058 A1 | 9/2016 | Benjamin et al. | |
| 2017/0132773 A1 * | 5/2017 | Toedtli | G06T 7/001 |
| 2017/0372262 A1 * | 12/2017 | Haney | G06Q 10/08 |
| 2018/0136052 A1 | 5/2018 | Nemet | |
| 2018/0155080 A1 | 6/2018 | Whitman et al. | |
| 2018/0365636 A1 | 12/2018 | Lucrecio et al. | |
| 2019/0019142 A1 * | 1/2019 | Cherneff | G01K 7/42 |
| 2019/0034863 A1 | 1/2019 | Winkle et al. | |
| 2019/0195695 A1 * | 6/2019 | Millhouse | G08B 19/02 |
| 2019/0318302 A1 | 10/2019 | Lawler, Jr. et al. | |
| 2020/0019927 A1 | 1/2020 | Muirhead | |
| 2020/0167724 A1 | 5/2020 | Klitenik et al. | |
| 2020/0193370 A1 | 6/2020 | Kilmer et al. | |
| 2021/0042594 A1 | 2/2021 | Nemet et al. | |
| 2021/0042871 A1 * | 2/2021 | Skonberg | G06Q 10/00 |
| 2021/0201704 A1 * | 7/2021 | Nygård | G06K 19/0717 |
| 2021/0243561 A1 | 8/2021 | Cunningham et al. | |

FOREIGN PATENT DOCUMENTS

| | | | | |
|---|---|---|---|---|
| JP | 6848365 B2 | 3/2021 | | |
| KR | 102164737 B1 | 10/2020 | | |
| RU | 2732678 C1 | 9/2020 | | |
| WO | WO-2005062216 A1 * | 7/2005 | | B65G 1/00 |
| WO | WO-2019018714 A1 * | 1/2019 | | B65D 19/0073 |
| WO | WO-2019046461 A1 | 3/2019 | | |
| WO | WO-2019226052 A1 | 11/2019 | | |

OTHER PUBLICATIONS

PCT International Search Report and Written Opinion for PCTUS2022/048155 which claims priority to the instant application; dated Mar. 3, 2023, 12 pages.

Extended European Search Report for EP22888218.9 that claims priority to the same parent application as the instant application; dated Nov. 25, 2024; 9 pages.

* cited by examiner

Outcome matrix + decision tree

| Outcome | RF logger | Chem indicator | Action |
|---|---|---|---|
| 1 | Good | Good | Immediately receive; No QC? |
| 2 | Good | Bad/Good | Reduced QC required Poor handling prior to shipment ? |
| 3 | Bad | Bad/Good | Reduced QC required Poor air circulation in transit ? |
| 4 | Bad | Bad | Immediately reject; No QC? |

FIG. 11

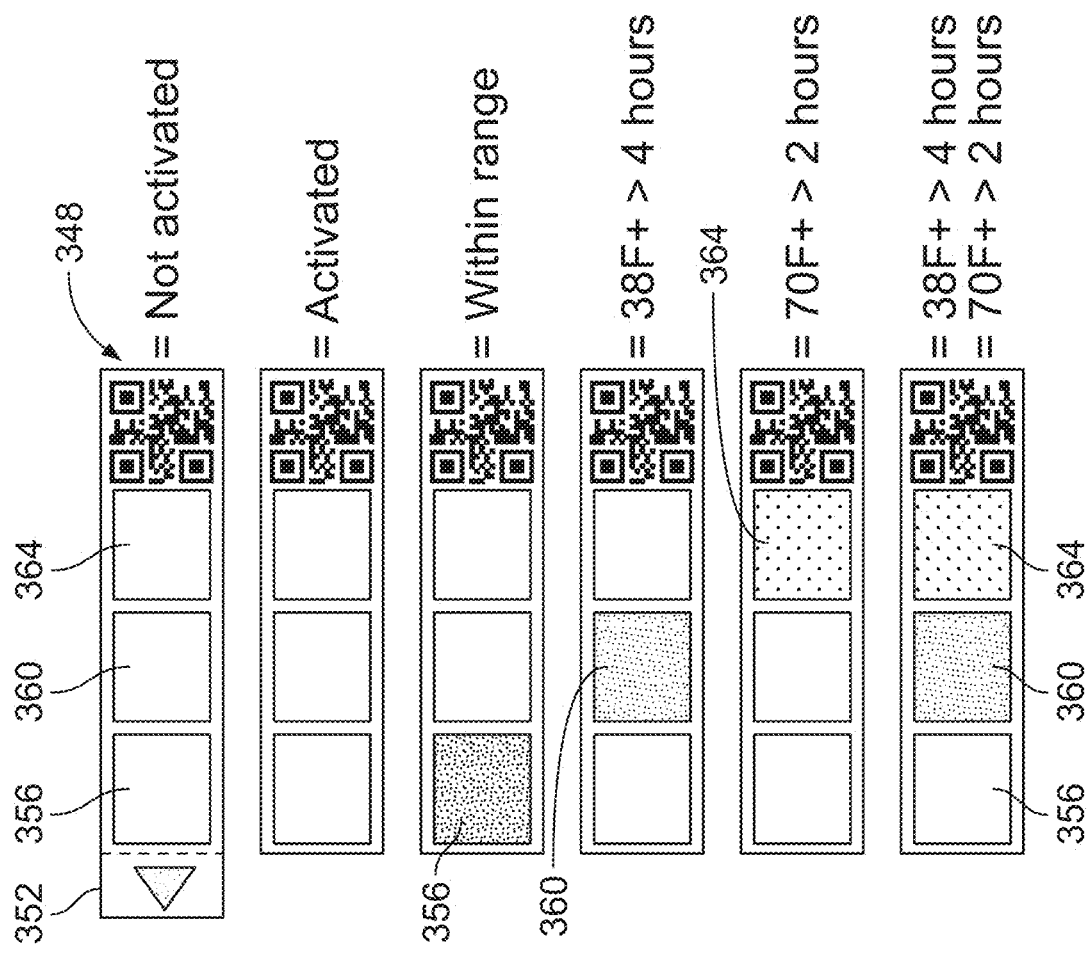
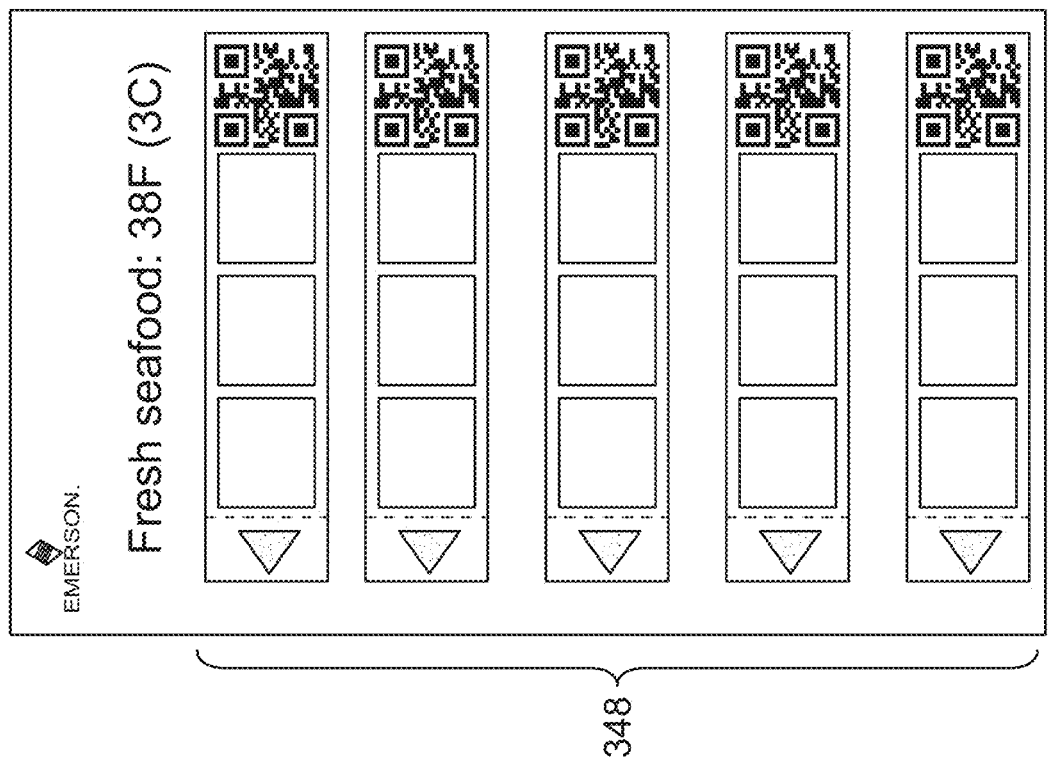
FIG. 12

BACK     In Progress     DELETE

Logger: AABBCC
SSCC: 9952040000000001235
PO #: 123123

Tags: ① ② ① filter

689789fff1
Not Activated

689789fff
Pallet likely experienced excess temperatures for 4 hourss

464563452
Pallet likely experienced excess temperatures for 2 hours

Test1245623
Pallet likely remained within temperature range

SEND

FIG. 16 (Cont...)

SYSTEMS AND METHODS FOR QUALITY MONITORING OF PALLETS

CROSS-REFERENCE TO RELATED APPLICATIONS

This application is a continuation of U.S. Non-Provisional patent application Ser. No. 17/975,732 filed Oct. 28, 2022, which published as U.S. Patent Application Publication US2023/0135805 on May 4, 2023 and issues as U.S. Pat. No. 12,248,900 on Mar. 11, 2025. U.S. Non-Provisional patent application Ser. No. 17/975,732 claims priority to and the benefit of U.S. Provisional Patent Application No. 63/273,293 filed Oct. 29, 2021. The entire disclosures of the above applications are incorporated herein by reference.

FIELD

The present disclosure relates to systems and methods for quality monitoring of pallets of goods (e.g., fresh seafood, other perishable goods, nonperishable goods, etc.) in a cargo.

BACKGROUND

This section provides background information related to the present disclosure which is not necessarily prior art.

A wireless radio frequency (RF) logger or tracker may be used to indicate that a shipment, cargo, or load including pallets and cases thereon (e.g., cases of fresh fish, etc.) was above a desired storage temperature during transit to a distribution center, warehouse, store, or other receiving location or facility in the supply chain. In response to the logger or tracker indicating that the shipment exceeded the desired storage temperature during transit, personnel at the receiving location may then visually inspect each pallet and case of the shipment. Oftentimes, it is not necessary to reject an entire shipment when only part of that shipment was actually compromised by the temperature excursion. For example, a pallet at a rear of a trailer and/or goods on a pallet near the ceiling of the trailer may sometimes be the only part of a shipment that is actually compromised by a temperature excursion during transit.

DRAWINGS

The drawings described herein are for illustrative purposes only of selected embodiments and not all possible implementations, and are not intended to limit the scope of the present disclosure.

FIG. 1 illustrates example components of a system configured for quality monitoring of a pallet of goods (e.g., fresh seafood, other perishable goods, nonperishable goods, etc.) in a cargo according to exemplary embodiments of the present disclosure. As shown, the system includes a temperature performance tag, a pallet level label including a shipping serial container code (SSCC), a portable monitoring device (e.g., RF logger or tracker, etc.), and an oversight cloud or cloud-based online portal.

FIG. 11 illustrates an outcome matrix and decision tree that may be used in a pallet level quality monitoring system and method according to exemplary embodiments of the present disclosure.

FIG. 12 illustrates example chemical indicators configured for visibly indicating temperature change occurrences by color changes. The chemical indicators may be used in a pallet level quality monitoring system and method according to exemplary embodiments of the present disclosure.

FIG. 14A illustrates the example pallet label shown in FIG. 13B after the chemical indicator's first portion has changed color (e.g., green, etc.) to thereby indicate that the allowed temperature/time range was not exceeded.

FIG. 14B illustrates the example pallet label shown in FIG. 13B after the chemical indicator's second and third portions have changed colors (e.g., yellow and red, etc.) to thereby indicate a dual temperature excursion and visibly notify quality control personnel that the pallet should be inspected.

Figure 16:
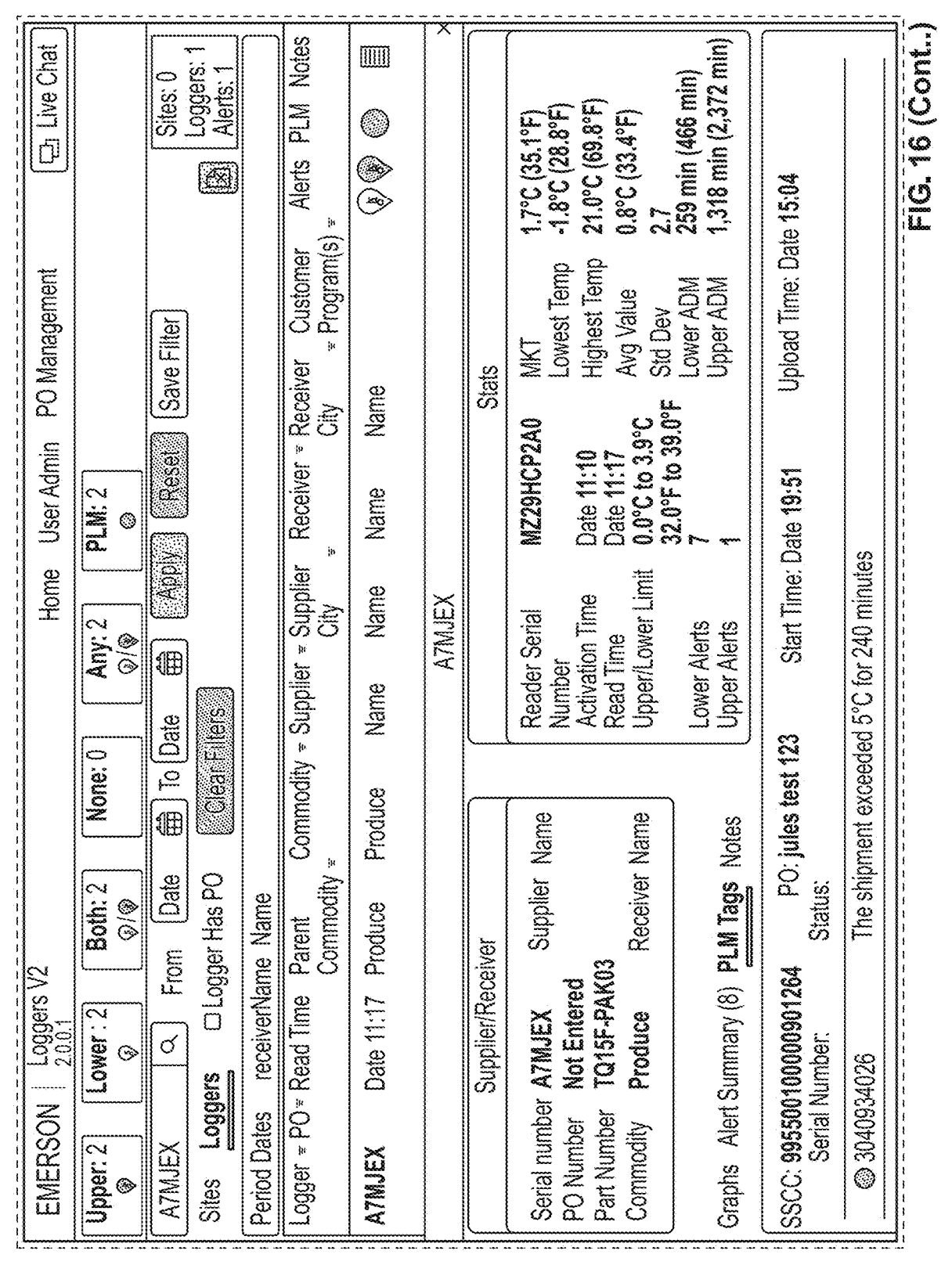
Figure 1:
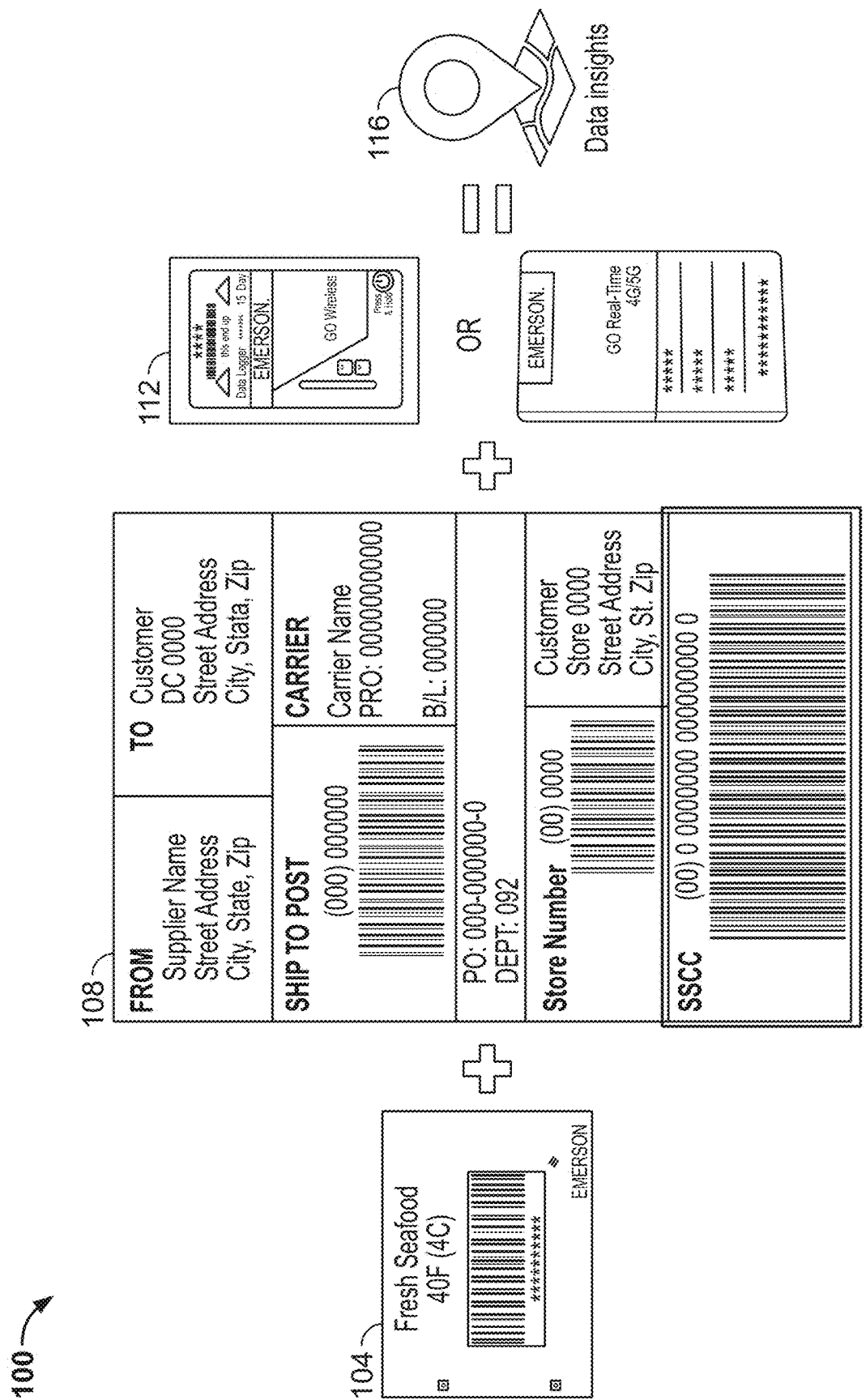

FIG. 16 includes exemplary screen shots of an App installed in a device that may be used in a pallet level quality monitoring system and method according to exemplary embodiments of the present disclosure.

Corresponding reference numerals may indicate corresponding (though not necessarily identical) features throughout the several views of the drawings.

DETAILED DESCRIPTION

Example embodiments will now be described more fully with reference to the accompanying drawings.

The present disclosure generally relates to cargo wireless RF loggers or trackers and the oversight of cold chain tracking and monitoring via a web-based portal and tracking system. As disclosed herein, exemplary embodiments are configured to enable data tracking and analysis of perishable products or goods on pallet(s) shipped via cargo, e.g., from a warehouse to a store, etc. Each pallet is provided with its own barcode and labels for determining the quality or health of the products or goods on each individual pallet. This will help the receiver identify if each pallet is acceptable or not via a physical indicator (e.g., color changing label, etc.) on the pallet. Devices may be used for scanning the labels or barcodes of the pallets. A cloud-based portal and App may be used to save and verify the information of each cargo.

As disclosed herein, exemplary embodiments tie or marry temperature information for each item on a pallet in a shipped cargo order to the overall temperature information for the shipping container, and ties that temperature information to the purchase order (PO) number, supplier information, and customer information. The information is uploaded to a cloud-based online portal (e.g., Oversight cloud, etc.), which, in turn, may communicate the information to the customer's cloud via an API network (Application Programming Interfaces).

Accordingly, aspects of the present disclosure include combining or marrying:

(1) data from a wireless RF logger or tracker (which is typically one per shipment per purchase order (PO) regardless of the number of pallets on the PO); with (2) the data from a visual label (which is one per pallet per shipment per PO); with (3) the supplier, customer, distributor, and carrier info.

The combined data/information may be used for the purpose of data analytics in the cloud and enabling a specific assessment of the quality of a shipment on a pallet by pallet level and on a level by level of a pallet. In exemplary embodiments, a logger or tracker may be provided on each pallet, and a label may be provided on a tote on the pallet.

By providing individual temperature labels on each pallet that are scannable by a handheld device and tying that information to the overall temperature data for the shipment, the customer can determine if certain items shipped can still be used if the overall temperature data might indicate that all the items in an order should be discarded. Also, this information may be tracked each time an order is loaded or unloaded during a shipment and can be used over time to determine if a supplier or shipper is unreliable.

Accordingly, disclosed herein are exemplary embodiments of systems and methods for quality monitoring of pallets and overall shipment from a supplier or distributor to an entity (e.g., customer, other recipient, etc.) that submitted the order for the shipment (e.g., fresh seafood or other perishable goods, etc.). In exemplary embodiments, a method includes placing a physical indicator (e.g., color changing label, etc.) on each pallet along with a cargo logger or tracker.

By way of background, when a shipment arrives at a distribution center or store, a logger or tracker may sometimes indicate that the load was above the desired storage temperature. In which case, personnel at the receiving location may visually inspect each pallet and case of fish or other goods on each pallet. The entire shipment is not necessarily rejected out of hand because oftentimes only part of the shipment may have been compromised by the temperature excursion. For example, pallets at the rear of the truck and those items on that pallet near the ceiling of the trailer may sometimes be the only part of a shipment that is actually compromised by a temperature excursion during transit. Advantageously, exemplary embodiments disclosed herein include visual indicators on each container (e.g., of fish or other perishable goods, etc.) stacked on a single pallet, which indicators can be relatively quickly scanned by receiving dock personnel using a handheld scanner. This greatly shortens the time to make the assessment on the shipment. In addition, the scanned information may be acquired and matched with the logger or tracker data. And the information about the shipment may be shared to the cloud for analysis, e.g., for the purpose of building a knowledge database for a customer to help identify unreliable shippers, distributors, suppliers, etc.

Exemplary embodiments are disclosed of systems and methods for quality monitoring pallets of goods (e.g., fresh seafood, other perishable goods, etc.) in a cargo. In exemplary embodiments, an application (App) may be installed in a handheld label scanner (broadly, a device), which may be configured to remotely store and monitor information of the goods. A first label or tag is attached to a pallet of goods. The first label includes information related to the goods. A second label or tag is also attached to the pallet of goods. The second label includes information mostly related to quality of the goods, which information is different than the information of the first label. The handheld label scanner is usable for scanning and reading the status/information of the first and second labels on the pallet of goods. The status/information of the first and second labels from the handheld label scanner is uploaded to an oversight cloud or cloud-based online portal, which, in turn, sends the status/information to the customer.

In exemplary embodiments, the first label attached to the pallet of goods is a shipping label. The second label attached to the pallet of goods is a temperature indicating label providing individual temperature information related to the goods. The second label may be configured to visibly indicate temperature change occurrences by changing its color. For example, the second label may comprise a temperature performance tag including a chemical indicator as shown in FIGS. 12-15. The chemical indicator may include a first portion that changes to a first color (e.g., green, etc.) to indicate that the allowed temperature/time range was not exceeded. The chemical indicator may include a second portion that changes to a second different color (e.g., yellow, etc.) to indicate that a first temperature/time range (e.g., greater than 38° F. for four hours, etc.) was exceeded but a second temperature/time range (e.g., greater than 70° F. for four hours, etc.) was not exceeded. The chemical indicator may include a third portion that changes to a third different color (e.g., red, etc.) to indicate that the second temperature/time range (e.g., greater than 70° F. for four hours, etc.) was exceeded. In addition, both the second and third portions of the chemical indicator may change their colors to indicate a dual temperature excursion, e.g., a first temperature excursion during which the first temperature/time range was exceeded, and a second temperature excursion when the second temperature/time range was exceeded.

In exemplary embodiments, the application (App) installed in the handheld label scanner (broadly, a device) for tracking and monitoring may comprise a tracker or logger application. The tracker or logger application may be configured to be operable for keeping track of cold chain shipments with real-time temperature, location, and security data.

In exemplary embodiments, individual temperature information for each item on a pallet is tied to the overall temperature information for the shipping container, which, in turn, is tied to the PO order number, supplier information, and customer information. By providing individual temperature labels that are scannable by a handheld device and tying that information to the overall temperature data for the shipment, the customer can determine if certain items shipped can still be used if the overall temperature data might indicate that all the items in an order should otherwise be discarded.

In exemplary embodiments, the information is tracked each time an order is loaded or unloaded during a shipment. The oversight cloud or cloud-based online portal sends the information to the customer cloud via an API network. The outcomes of scanning the labels or tags with the handheld label scanner may include green for within the allowed temperature/time range, red for outside temperature range for 4 hours, yellow for outside temperature for 2 hours, and grey for tag not activated.

With reference now to the figures, FIG. 1 illustrates example components of a system 100 configured for quality monitoring of a pallet of goods (e.g., fresh seafood, other perishable goods, nonperishable goods, etc.) in a cargo according to exemplary embodiments of the present disclosure. As shown, the system 100 includes a temperature performance label or tag 104, a pallet level label or tag 108, a portable monitoring device 112, and an oversight cloud or cloud-based online portal 116.

The pallet level label 108 may comprise a shipping label including a shipping serial container code (SSCC). The temperature performance tag 104 may comprise a temperature indicating label providing individual temperature information related to the goods, e.g., Fresh Seafood 40° F., etc. The temperature performance tag 104 may be configured to be operable via a reaction to changes in temperature starts or stops "melting" process and simulates surface of product versus air temperature. The temperature performance tag 104 may be less sensitive to temperature changes (thermal mass) than an IoT device. The temperature performance tag 104 may be pre-conditioned and applied in a cold area (freezer). The temperature performance tag 104 may be pull-tab activated (e.g., an irreversible action). The temperature performance tag 104 may have a typical "run-off time" of 4 hours at about 50° F.—product surface simulation, wherein warmer temperatures yields faster run-off time and colder temperatures yields slower run-off time. The temperature performance tag 104 may have an adhesive back for attachment to a pallet.

The portable monitoring device 112 may comprise a wireless tracker, logger, recorder, an Internet of Things (IoT) device, etc. The cloud-based online portal 116 (e.g., Oversight cloud-based online portal and app, etc.) may be configured for communicating with a customer cloud-based system (e.g., database of shipment information, etc.) via an Application Programming Interface (API), e.g., for reporting data analytics in the cloud and enabling a specific assessment of the quality of a shipment on a pallet by pallet level and on a level by level of a pallet, etc.

Figure 2:
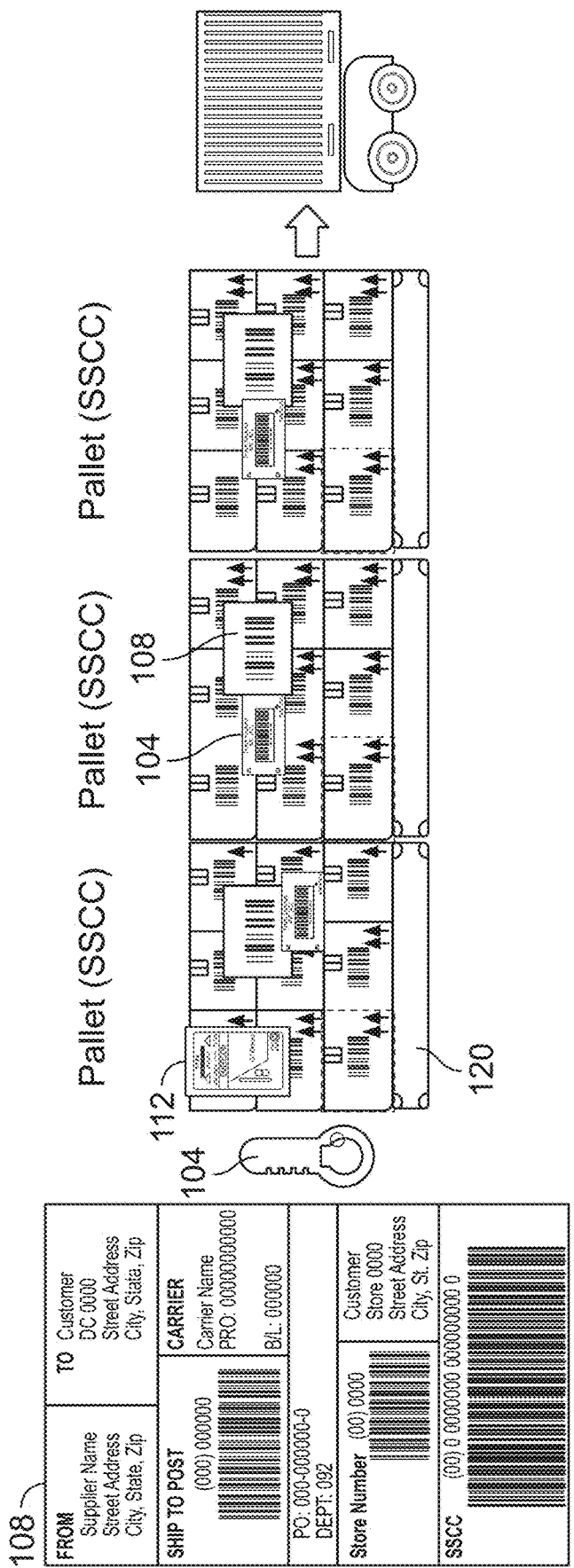
FIGS. 2-4 illustrate steps of an exemplary method for quality monitoring of pallets of goods (e.g., fresh seafood, other perishable goods, nonperishable goods, etc.) in a cargo according to exemplary embodiments of the present disclosure.
Figure 3:
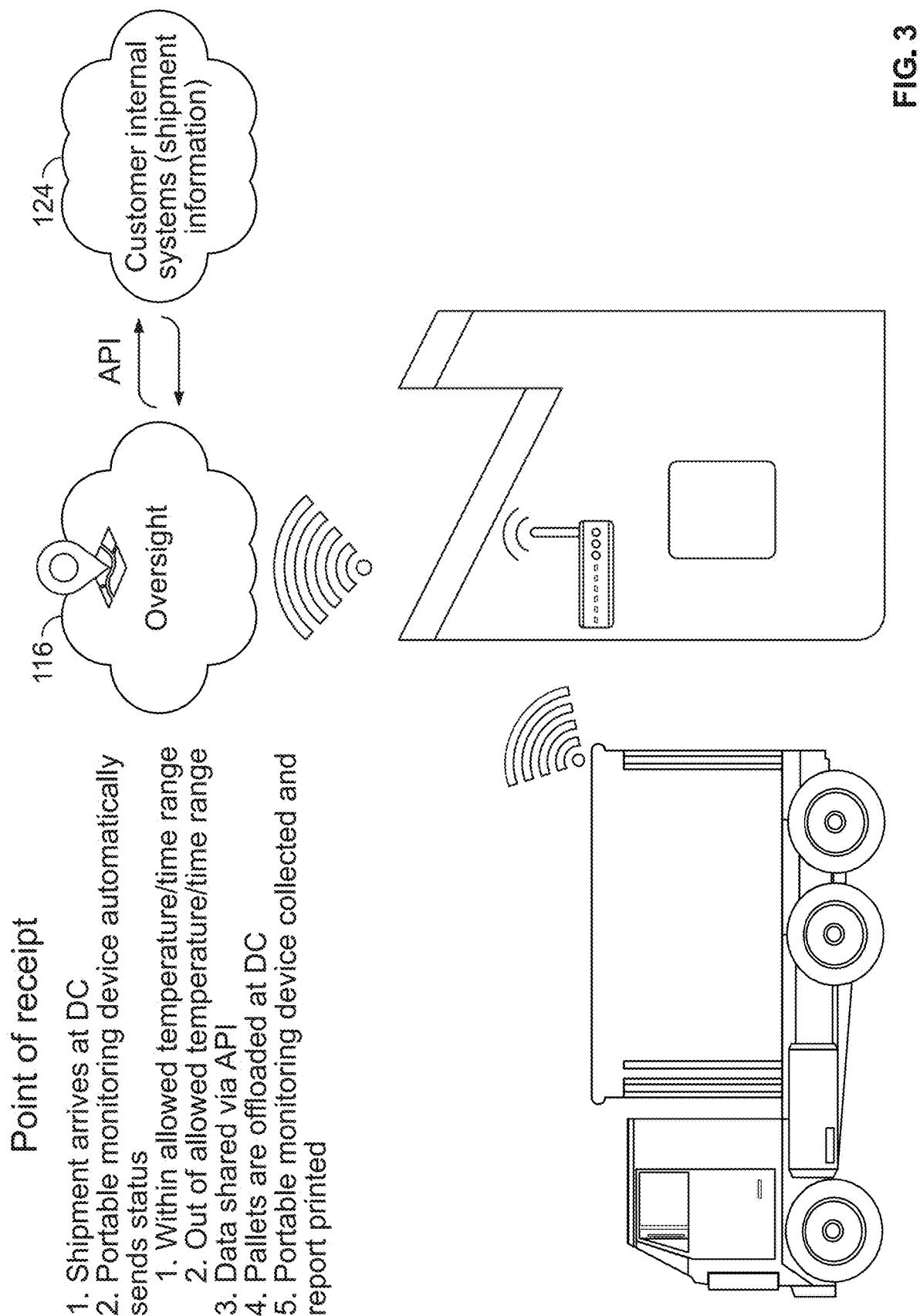
Figure 4:
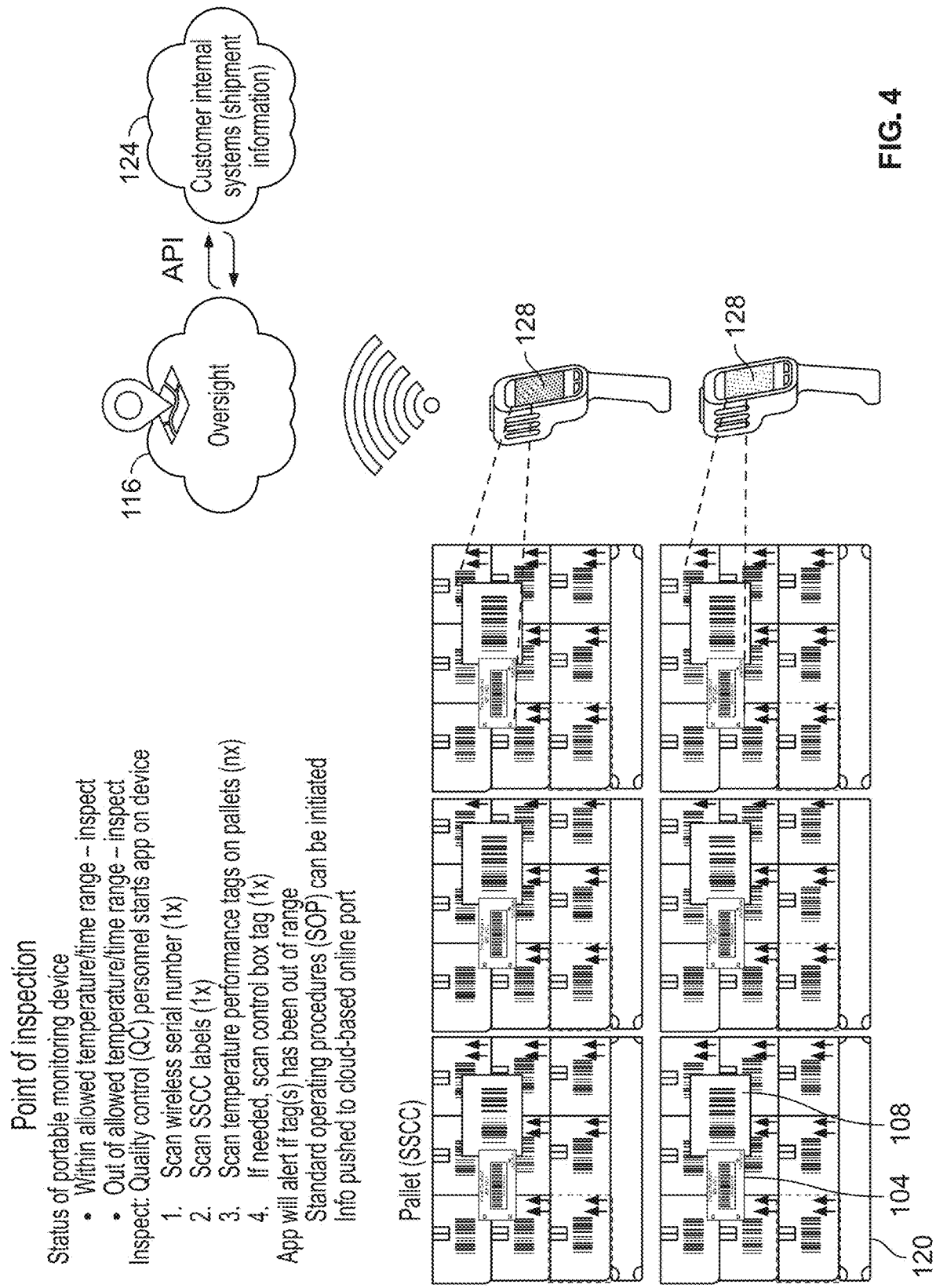

FIGS. 2-4 illustrate steps of an exemplary method for quality monitoring of pallets of goods (e.g., fresh seafood, other perishable goods, nonperishable goods, etc.) in a cargo. As shown in FIG. 2, the following may occur at the point of shipment (e.g., outbound to distribution center (DC), etc.). A shipment of pallets is prepared and placed in cold storage. Temperature performance tags are retrieved from cold storage. A temperature performance tag 104 is placed on or applied to each pallet 120 and activated. In this example, the method further includes allocating and clearly marking a control box per purchase order, and activating and placing a temperature performance tag in the control box. A portable monitoring device 112 (e.g., a wireless RF tracker, logger, recorder, an Internet of Things (IoT) device, etc.) is activated and located per purchase order. A pallet level label 108 (e.g., a shipping label including a shipping serial container code (SSCC), etc.) is placed on or applied to each pallet 120. Thereafter, the shipment is shipped.

The temperature performance tag 104 should preferably be kept in cold storage (e.g., a freezer, etc.) for optimal or improved performance. And activation of the temperature performance tags 104 should preferably occur where the product is stored.

As shown in FIG. 3, the following may occur at the point of receipt. The shipment arrives at a destination (e.g., distribution center (DC), etc.), and the portable monitoring device 112 (e.g., wireless tracker, logger, recorder, etc.) for the purchase order automatically sends status information regarding whether the purchase order was within allowed temperature/time range or out of allowed temperature/time range. The data is shared with customer internal systems 124 (e.g., customer cloud-based database of shipment information, etc.) via Application Programming Interface (API). The pallets are offloaded. The portable monitoring device is collected and report printed.

As shown in FIG. 4, the following may occur at the point of inspection. The status of the portable monitoring device (e.g., wireless tracker, logger, recorder, etc.) for the purchase order indicates whether the purchase order was within the allowed temperature/time range or out of the allowed temperature/time range. The inspection process includes quality control (QC) personnel starting an App on a handheld label scanner (broadly, a device including a scanner). The QC personnel scans the wireless serial number, the shipping serial container code (SSCC) labels on the pallets, and the temperature performance tags on the pallets. If needed, the control box tag may also be scanned. If the scanned temperature performance tags indicate that a pallet(s) was out of the allowed temperature/time range, the App generates an alert(s). And standard operating procedures (SOP) are initiated. Information is pushed to the oversight cloud or cloud-based online portal 116, which information is shared with the customer internal systems 124 via API. The handheld label scanner 128 may comprise a camera (e.g., camera of a smartphone, etc.), infrared scanner, Bluetooth (BT) device, a near field communication (NFC) device, radio-frequency identification (RFID) device, etc.

Figure 5:
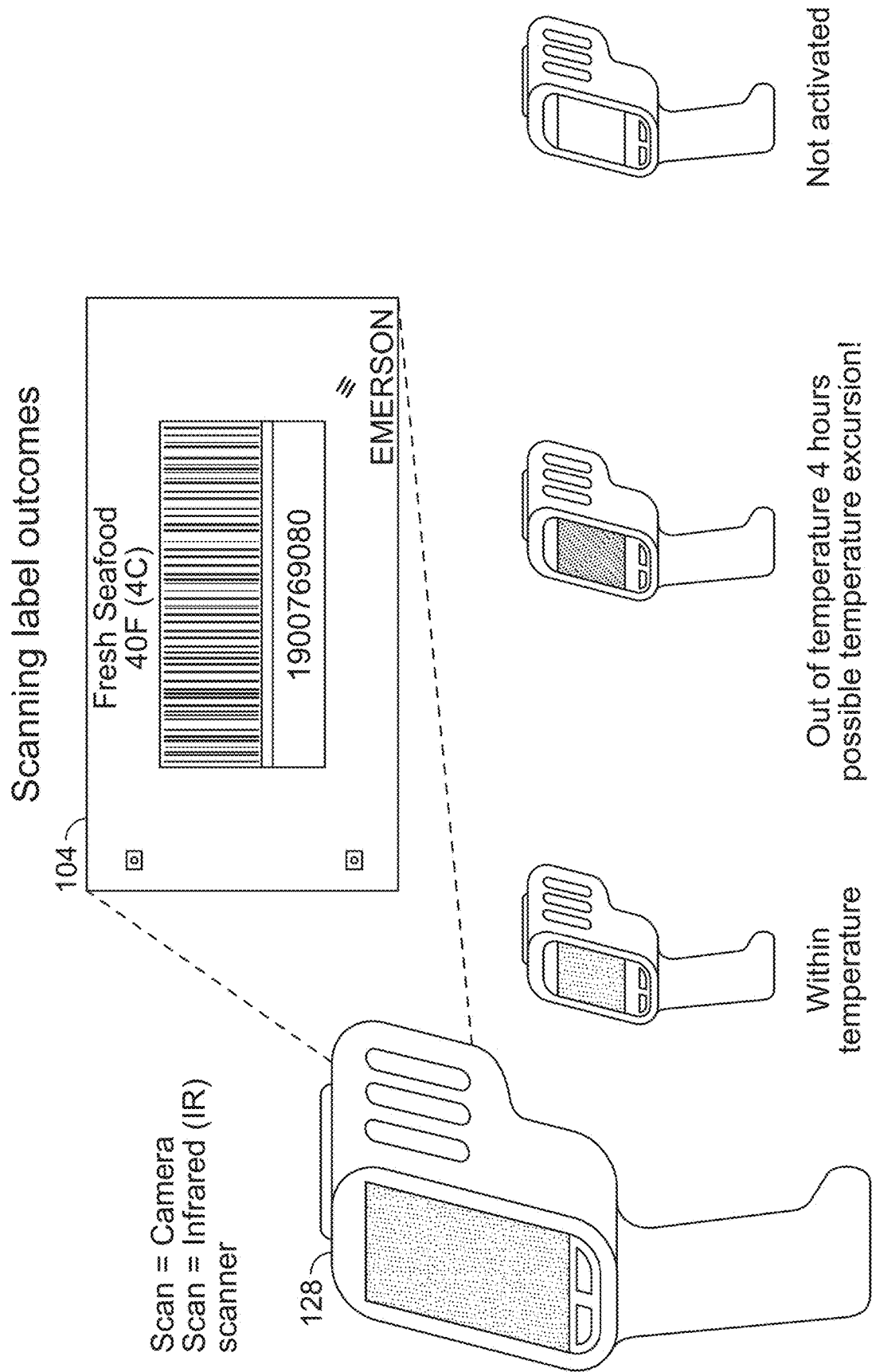
FIG. 5 illustrates scanning label outcomes that may occur when a temperature performance tag is scanned by QC personnel using a handheld label scanner according to exemplary embodiments of the present disclosure.

FIG. 5 illustrates scanning label outcomes that may occur when a temperature performance tag 104 is scanned by QC personnel using a handheld label scanner 128. As shown in FIG. 5, the scanning label outcomes include that the goods (e.g., fresh seafood, other perishable goods, etc.) were within the allowable temperature/time range, out of the allowed temperature/time range (e.g., temperature exceeded 40° F. for 4 hours, etc.), or that the temperature performance tag was not activated. The color of the display of the handheld label scanner 128 may visibly indicate the outcome. For example, a green display may indicate the goods were within the allowable temperature/time range, a red display may indicate the goods were out of the allowed temperature/time range, and a grey display may indicate that the temperature performance tag was not activated.

Figure 6:
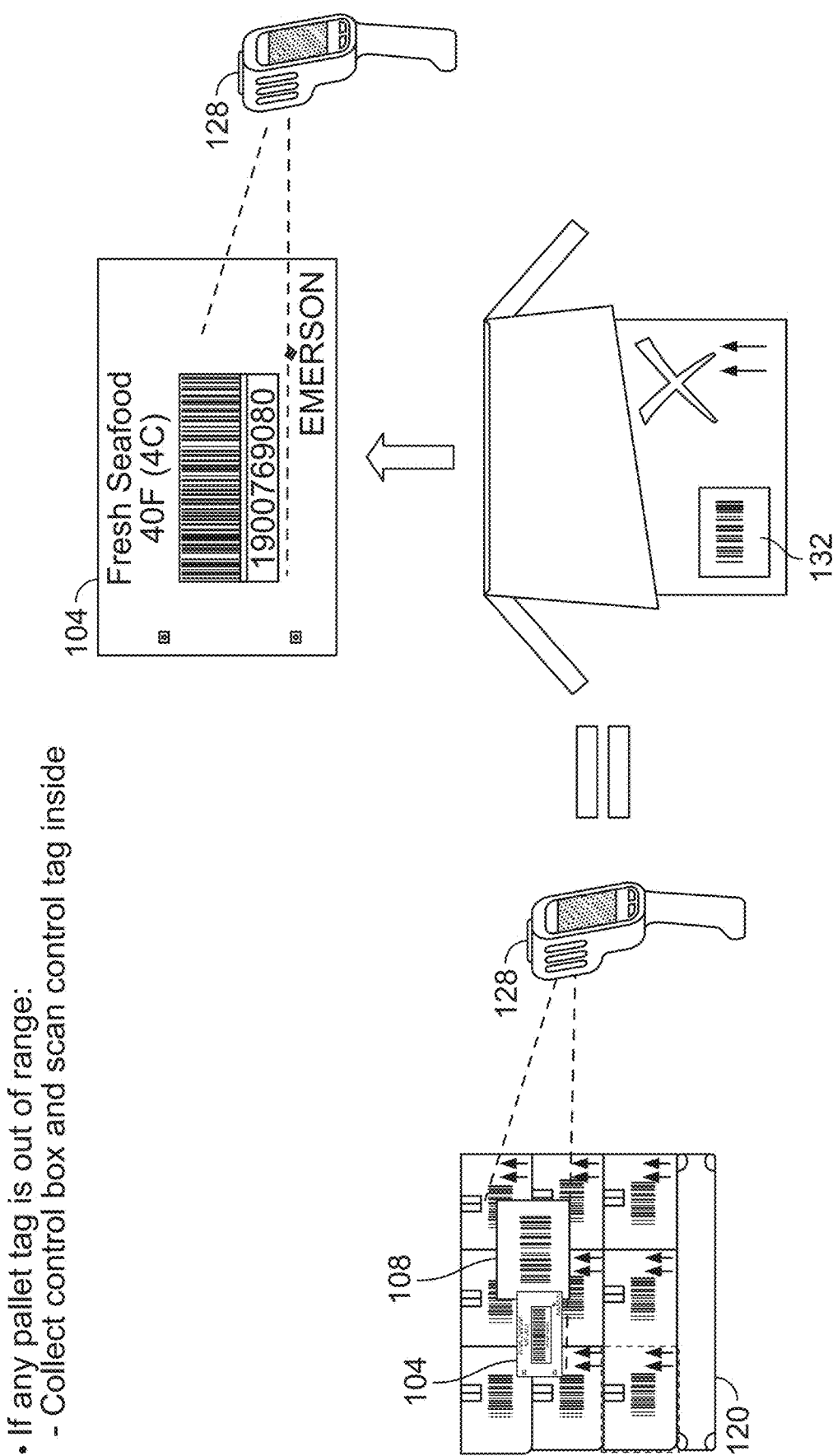
FIG. 6 is a diagram illustrating that a temperature performance tag inside the control box may be scanned when any pallet temperature performance tag is outside of the allowed temperature/time range according to an exemplary embodiment of a method for quality monitoring of pallet(s) of goods (e.g., fresh seafood, other perishable goods, nonperishable goods, etc.) in a cargo.
Figure 7:
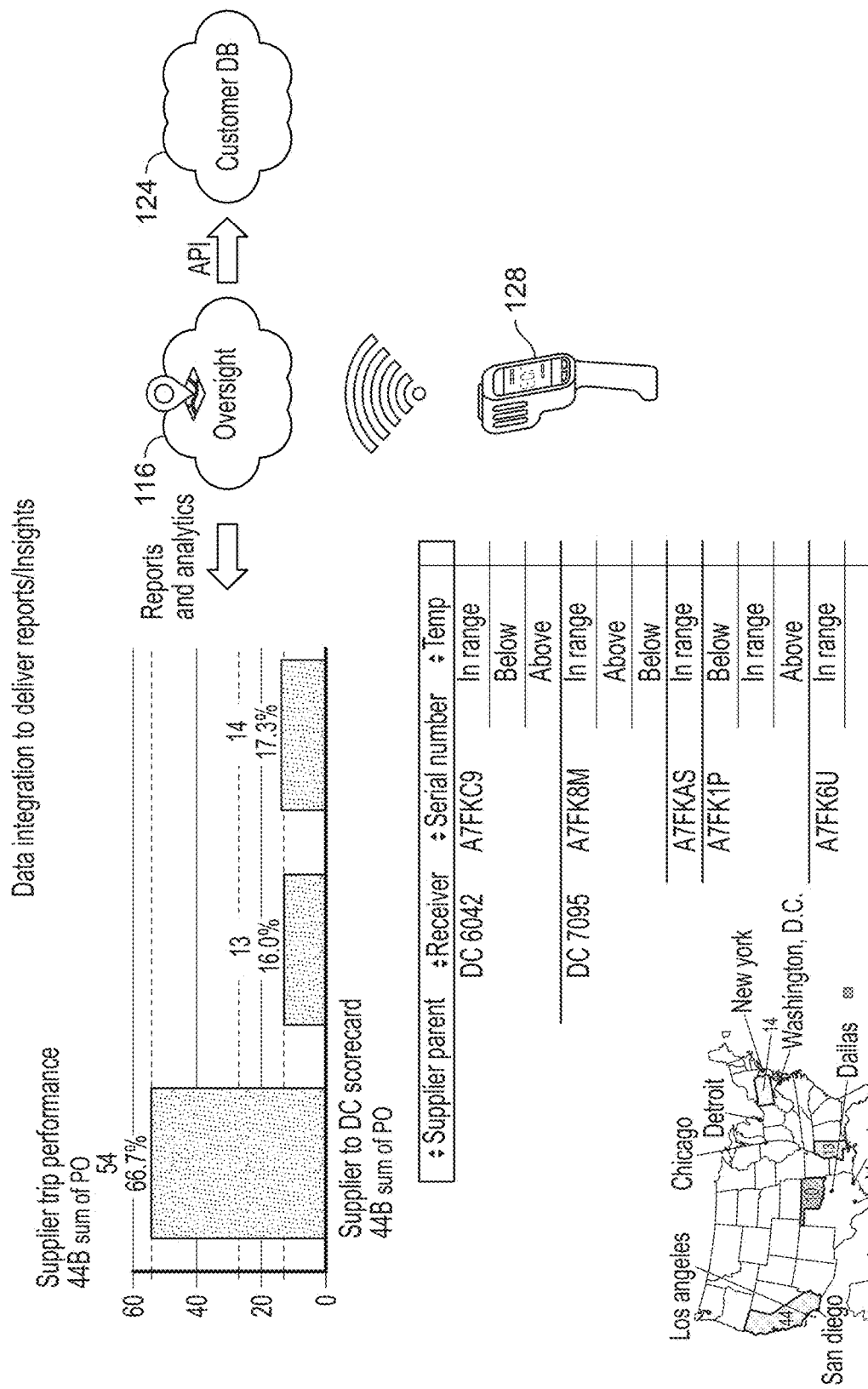
FIG. 7 is a diagram illustrating the data integration to deliver reports/insights that may occur in a pallet level quality monitoring system and method according to exemplary embodiments of the present disclosure.

As shown in FIG. 6, the temperature performance tag 104 inside the control box 132 may be scanned with the handheld label scanner 128 whenever any pallet temperature performance tag 104 is outside of the allowed temperature/time range (e.g., more than 40° F. for four hours, etc.), FIG. 7 illustrates data integration to deliver reports/insights, which may occur in a pallet level quality monitoring system and method according to exemplary embodiments of the present disclosure. As shown, the handheld label scanner 128 may upload information to the oversight cloud or cloud-based online platform 116. The uploaded information may be used for reports and analytics. The uploaded information may also be shared with customer internal systems 124 (e.g., customer cloud-based database of shipment information, etc.) via Application Programming Interface (API). The information may be shared from the handheld label scanner 128 to the cloud for analysis, e.g., for the purpose of building a knowledge database for a customer to help identify unreliable shippers, distributors, suppliers, etc. The handheld label scanner 128 may be configured with one-way firewall access to the oversight cloud or cloud-based online platform 116. The data integration shown in FIG. 7 may provide added insights and an improved cold chain, supplier management, and quality layer.

Figure 8:
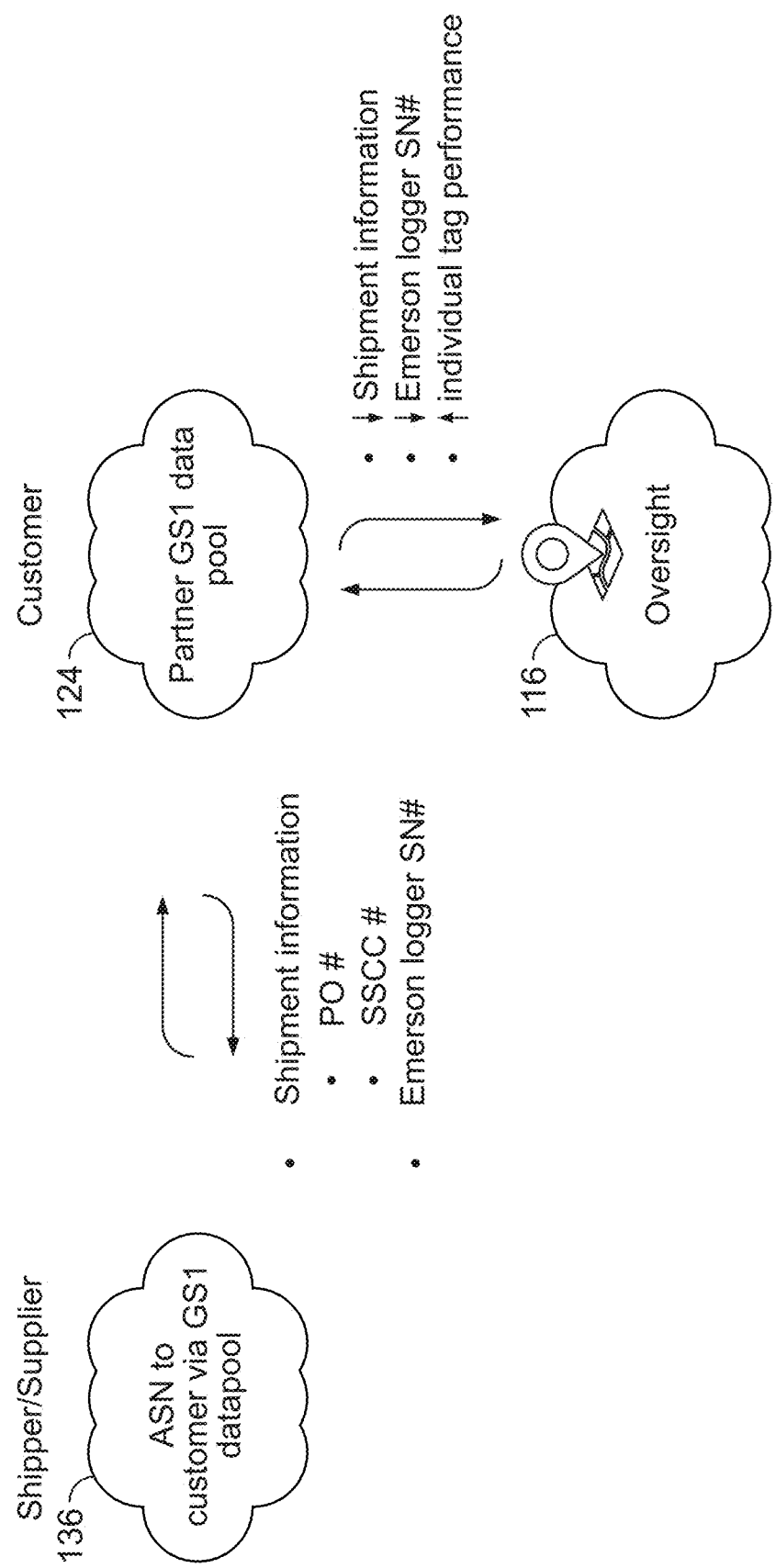
FIG. 8 is a diagram illustrating data sharing between a shipper/supplier and a customer and data sharing between the customer and a cloud-based online portal (e.g., Oversight cloud-based online portal and app, etc.).

FIG. 8 illustrates data sharing between a shipper/supplier 136 and a customer 124 and data sharing between the customer 124 and the oversight cloud or cloud-based online portal 116. As shown in FIG. 8, shipment information (e.g., purchase order number (PO #), shipping serial container code number (SSCC #), etc.) and the logger serial number may be shared via advance ship notice (ASN) to the customer 124 via GS1 datapool. The shipment information, logger serial number, and individual tag performance may be shared via partner GS1 data pool. The cloud-based online portal 116 is located in the cloud, such as at one or more offsite or third party locations with online or networked storage, etc.

Figure 9:
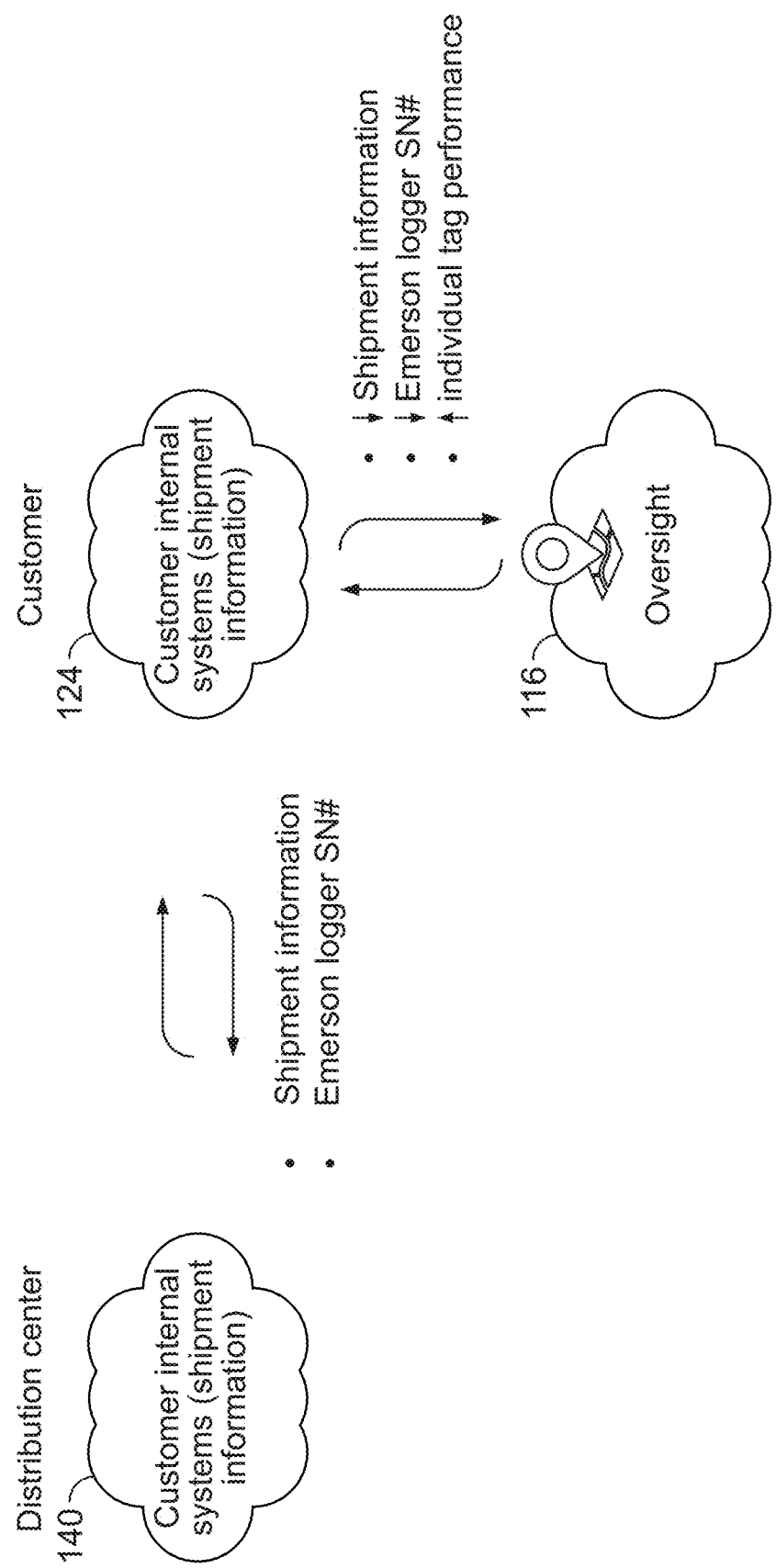
FIG. 9 is a diagram illustrating data sharing between a distribution center and a customer and data sharing between the customer and a cloud-based online portal.

FIG. 9 illustrates data sharing between a distribution center 140 and a customer 124 and data sharing between the customer 124 and the oversight cloud or cloud-based online portal 116. As shown in FIG. 9, shipment information (e.g., purchase order number (PO #), shipping serial container code number (SSCC #), etc.) and the logger serial number may be shared between the distribution center and the customer the via the customer's internal systems. The shipment information, logger serial number, and individual tag performance may be shared between the customer and the cloud-based online portal via the customer's internal systems.

Figure 10:
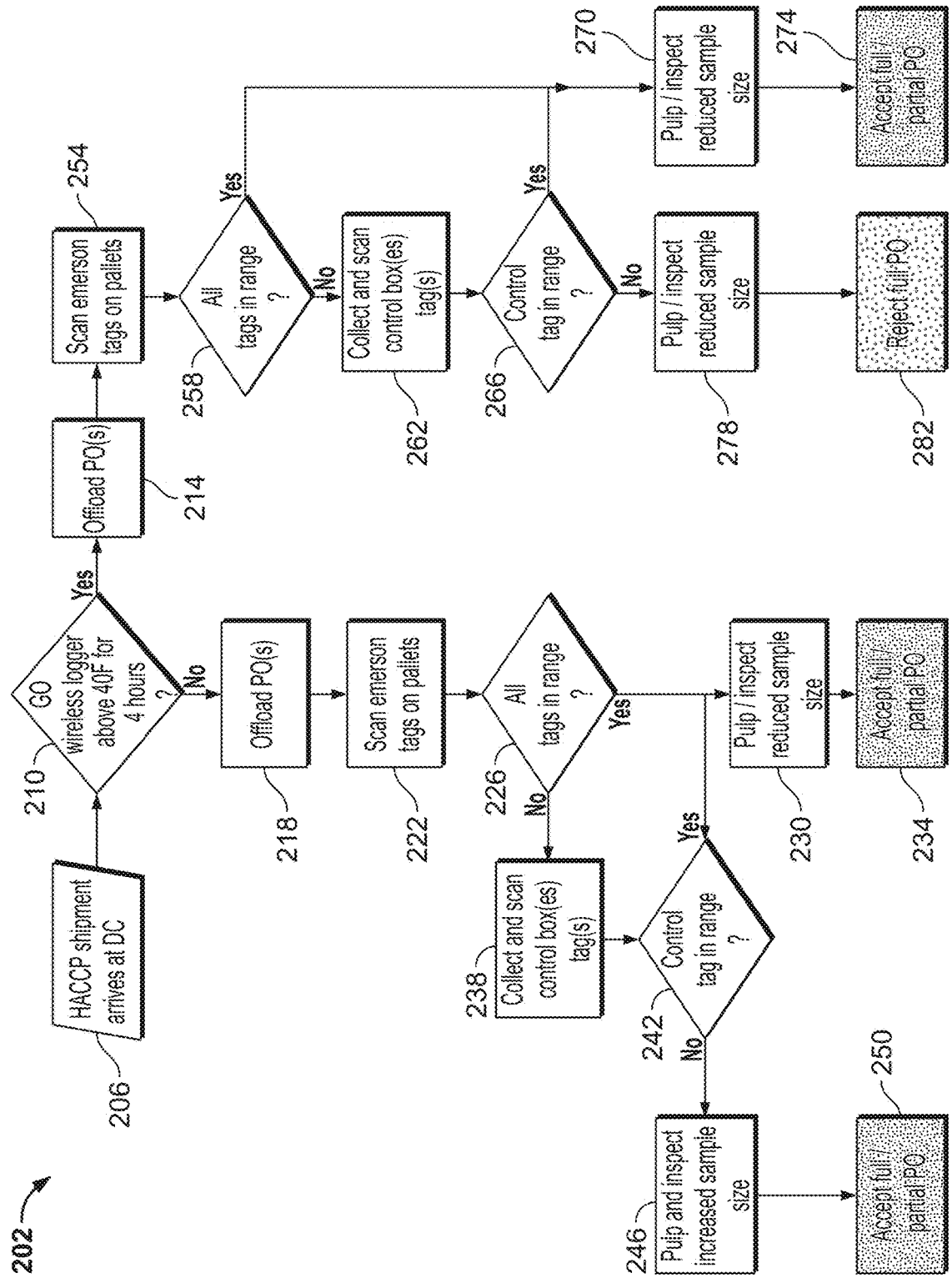
FIG. 10 is a process flow diagram of a pallet level quality monitoring method according to an exemplary embodiment of the present disclosure.

FIG. 10 is a process flow diagram of a pallet level quality monitoring method 202 according to exemplary embodiments of the present disclosure. At 206, an HCCPA shipment arrives, e.g., at the distribution center, etc.

At 210, if the logger, tracker, or recorder indicates that allowed temperature/time range (e.g., above 40° F. for 4 hours, etc.) was exceeded, then the method 202 proceeds to 214 at which the purchase order (PO) is offloaded. But if the logger, tracker, or recorder indicates that allowed temperature/time range was not exceeded at 210, then the method 202 proceeds to 218 at which the purchase order (PO) is also offloaded.

At 222, the temperature performance tags on the pallets are scanned. If all temperature performance tags are in range at 226, then the method proceeds to 230 for pulp/inspection of a reduced sample size to determine whether or not to accept the full or partial purchase order (PO) at 234.

In exemplary embodiments, the inspection process includes offloading pallets from the truck. The designated number of pallets are then broken into sections based on position within the truck (front, mid, rear) and then broken into sections based on pallet height (low, mid, high). After selection of boxes containing product to pulp is completed, the package is opened and the pulp probe is inserted into the product. This process is repeated and performed to meet the SOP of the customer, etc. With information whether pallets were exposed to prolonged temperature excursions or not, the customer can either increase (all tags out of range) or decrease (all tags in range) the number of pallets and boxes to be inspected and pulped to verify pulp temperature per food safety requirements.

The conditions to accept or reject a full purchase order is determined by the customer utilizing the exemplary system// method disclosed herein. Performance tag outcomes in conjunction with wireless IOT data offer an additional data point to drive better food safety decisions. The performance tags indicate if they have been exposed to temperature excursion events where they are located. As such, one scenario would include a wireless/RF logger or tracker (e.g., GO Wireless/ Go Real-Time RF logger or tracker, etc.) indicating no temperature excursion, all tags are in range. This information may lead to reduced points of pulp inspection and subsequently saves time to accept inventory and reduces labor of QC to otherwise perform their standard QC tasks without such a system/method disclosed herein.

If all temperature performance tags are not in range at 226, then the method proceeds to 238 at which the temperature performance tag(s) inside the control box(es) are collected and scanned. If the control box(es) tag(s) are in range at 242, then the method proceeds to 230 for pulp/inspection of a reduced sample size to determine whether or not to accept the full or partial purchase order (PO) at 234. But if the control box(es) tag(s) are not in range at 242, then the method proceeds to 246 for pulp/inspection of an increased sample size to determine whether or not to accept the full or partial purchase order (PO) at 250.

In the event a wireless/RF logger or tracker (e.g., GO Wireless/Go Real-Time RF logger or tracker, etc.) indicates a temperature excursion, as well as performance tags are out of range, the process (based on customer SOP) could be reversed. In an effort to ensure product is not wasted by rejection, an increased number of pallets and boxes are selected for pulping (internal temperature).

Referring back to 214, the purchase order (PO) is offloaded if the logger, tracker, or recorder indicates that allowed temperature/time range (e.g., above 40° F. for 4 hours, etc.) was exceeded. At 254, the temperature performance tags on the pallets are scanned. If all temperature performance tags are in range at 258, then the method proceeds to 270 for pulp/inspection of a reduced sample size to determine whether or not to accept the full or partial purchase order (PO) at 274.

But if all temperature performance tags are not in range at 258, then the method proceeds to 262 at which the control box(es) temperature performance tag(s) are collected and scanned. If the control box(es) tag(s) are in range at 266, then the method proceeds to 270 for pulp/inspection of a reduced sample size to determine whether or not to accept the full or partial purchase order (PO) at 274. But if the control box(es) tag(s) are not in range at 266, then the method proceeds to 278 for pulp/inspection of a reduced sample size and the full purchase order (PO) is rejected at 282.

In this scenario, the control tag (which was inside of the box) offers insight into what may have happened at product level. If this tag is out of range, it is likely that other product is bad. As such, the customer (based on their internal QC SOPs) may want to reduce the pulp sample size to more quickly come to the determination to reject the full purchase order (PO).

FIG. 11 illustrates an outcome matrix and decision tree that may be used in a pallet level quality monitoring system and method according to exemplary embodiments of the present disclosure. In this example, the temperature performance tags comprise chemical indicators that are configured to visibly indicate temperature change occurrences by changing colors (e.g., FIGS. 12-15, etc.).

As shown for outcome 1, the shipment is immediately received without requiring any quality control (QC) if the radio frequency (RF) logger (e.g., portable monitoring device 112 (FIGS. 1 and 2), etc.) for the purchase order (PO) and the chemical indicators indicate that the allowed temperature/time range was not exceeded.

For outcome 2, reduced quality control is required if the radio frequency (RF) logger for the purchase order (PO) indicates that the allowed temperature/time range was not exceeded but one or more (but not all) of the chemical indicators indicate that the allowed temperature/time range was exceeded. This may occur due to poor handling of the goods and/or chemical indicators prior to shipment.

For outcome 3, reduced quality control is required if the radio frequency (RF) logger for the purchase order (PO) indicates that the allowed temperature/time range was exceeded but one or more (but not all) of the chemical indicators indicate that the allowed temperature/time range was not exceeded. This may occur due to poor air circulation in transit.

For outcome 4, the shipment is immediately rejected without requiring any quality control (QC) if the radio frequency (RF) logger and the chemical indicators indicate that the allowed temperature/time range was exceeded.

FIG. 12 illustrates example chemical indicators 348 configured for visibly indicating temperature change occurrences by color changes. As shown in FIG. 12, the chemical indicator 348 may include a removable portion or pull-tab 352 that is removed by the user for activation and to indicate that the chemical indicator 348 is activated.

The chemical indicator 348 may include first, second, and third portions 356, 360, 364 configured for visibly indicating temperature change occurrences by color changes. For example, the chemical indicator's first portion 356 may be configured to change to a first color (e.g., green, etc.) to indicate that the allowed temperature/time range was not exceeded. The chemical indicator's second portion 360 may be configured to change to a second color (e.g., yellow, other color different than the first color, etc.) to indicate that a first temperature/time range (e.g., greater than 38° F. for four hours, etc.) was exceeded but a second temperature/time range (e.g., greater than 70° F. for four hours, etc.) was not exceeded. The chemical indicator's third portion 364 may be configured to a third color (e.g., red, other color different than the first and second colors, etc.) to indicate that the second temperature/time range (e.g., greater than 70 OF for four hours, etc.) was exceeded. In addition, both the second and third portions 360, 364 of the chemical indicator 348 may change their colors to indicate a dual temperature excursion, e.g., a first temperature excursion during which the first temperature/time range was exceeded, and a second temperature excursion when the second temperature/time range was exceeded.

Figures 13A, 13B:
FIGS. 13A and 13B illustrate an example pallet label before and after the chemical indicator shown in FIG. 12 was applied to the pallet label.

FIGS. 13A and 13B illustrate an example pallet label 368 before and after the chemical indicator 348 shown in FIG. 12 was applied to the pallet label 368.

Figures 14A, 14B:
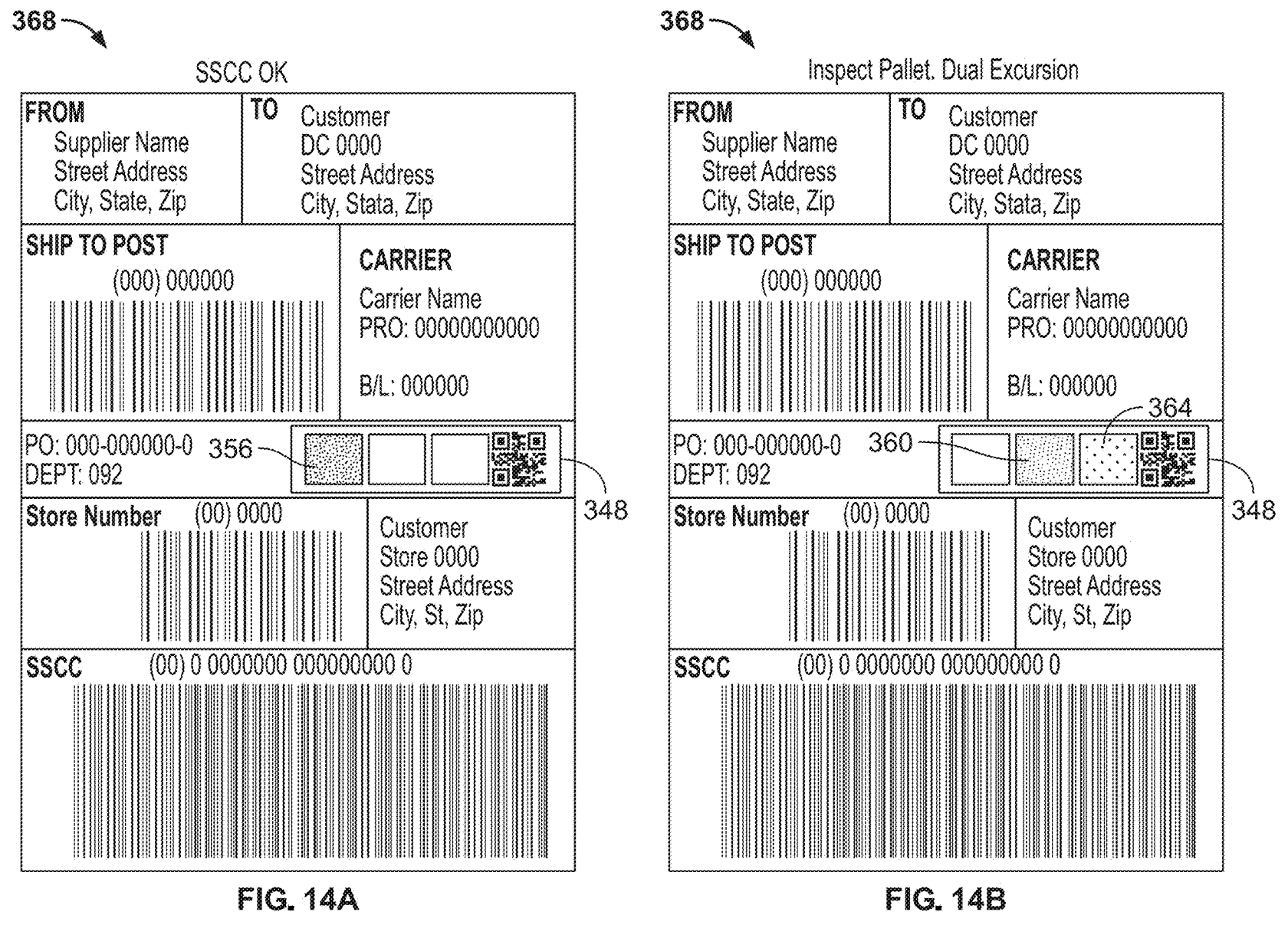

FIG. 14A illustrates the example pallet label 368 shown in FIG. 13B after the first portion 356 of the chemical indicator 348 has changed color (e.g., green, etc.) to thereby indicate that the allowed temperature/time range was not exceeded.

FIG. 14B illustrates the example pallet label 368 shown in FIG. 13B after the second and third portions 360, 364 of the chemical indicator 348 have changed colors (e.g., yellow and red, etc.) to thereby indicate a dual temperature excursion and visibly notify quality control personnel that the pallet should be inspected.

Figure 15:
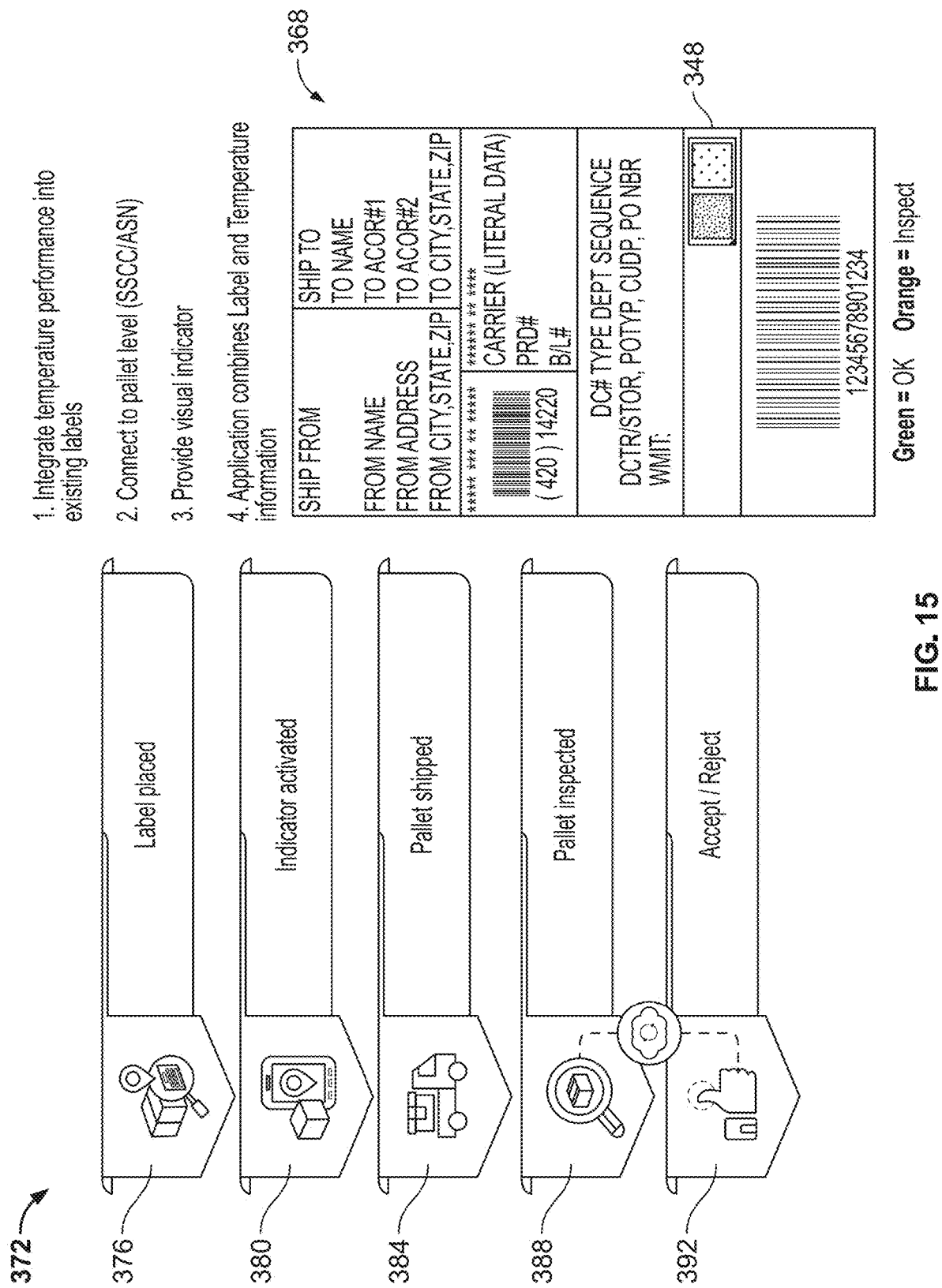
FIG. 15 is a diagram illustrating the pallet label with the chemical indicator shown in FIG. 13B being incorporated into a pallet level quality monitoring method according to an exemplary embodiment of the present disclosure.

FIG. 15 is a diagram illustrating the pallet label 368 with the chemical indicator 348 shown in FIG. 13B being incorporated into a pallet level quality monitoring method 372 according to an exemplary embodiment of the present disclosure. At 376, the pallet label 368 (and the chemical indicator 348 thereon) is placed or applied to a pallet of goods (e.g., fresh seafood, other perishable goods, nonperishable goods, etc.). At 380, the chemical indicator 348 is activated before the pallet is shipped at 384. The pallet may then be inspected at 388, e.g., if the chemical indicator 348 indicates (e.g., orange, etc.) should be inspected. At 392, the pallet is accepted or rejected depending on the chemical indicator 348 and pallet inspection. Accordingly, exemplary embodiments may advantageously integrate temperature performance into existing labels, connect to pallet level (shipping serial container code number (SSCC)/advance ship notice (ASN)), provide visual indicators (e.g., green=OK, orange=inspect, etc.), and combine label and temperature information.

In exemplary embodiments, the labels may be barcode scannable. GS1 data may be combined with indicator information and wireless RF logger data in the oversight cloud or cloud-based online portal. The labels may include an easily visible and discernible pass/inspect indicator (e.g., green for pass, orange for inspect, etc.). Exemplary embodiments may be configured to provide end-to-end cold chain visibility (e.g., farm to store, etc.) and/or be enabled for GS1 GTIN. Exemplary embodiments may provide a solution that visually alerts quality control (QC) if a pallet has been outside of an allowed temperature/time range, which will allow QC to expedite or be selective about which pallets to accept/reject, improve inventory turns, and more efficient use of skilled labor.

Exemplary embodiments disclosed herein may provide one or more (but not necessarily any or all) of the following benefits including: time and effort savings to QC personnel, layer of information at individual pallet performance (indicator), inventory turn-over improvements yielding cost savings, added data insights and corrective suggestions, wireless RF tracker or logger provides historical data of temperature (e.g., exact date and time of trailer temperature excursion event), traceability between Inbound to DC and Outbound to Store, and database integration allows for traceability and connecting IoT devices with purchase orders (POs) and performance indicators.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for quality monitoring of a pallet(s) of goods in a cargo during transit, the system comprising:
   one or more pallet temperature performance tags, each said pallet temperature performance tag configured to be coupled with a corresponding one of the pallet(s) of goods in the cargo and operable for indicating that the individual corresponding pallet has experienced any temperature excursion event;
   one or more portable monitoring devices, each said portable monitoring device configured to be coupled with a corresponding purchase order in the cargo and operable for indicating that the cargo, including the pallet(s) of goods, of the individual corresponding purchase order has experienced any temperature excursion event;
   one or more control box temperature performance tags, each said control box temperature performance tag configured to be positioned within a corresponding control box for each purchase order in the cargo and operable for indicating that the goods within the individual corresponding control box have experienced any temperature excursion event; and
   one or more pallet level shipping labels including shipping information, each said pallet level shipping label configured to be coupled with a corresponding one of the pallet(s) of goods in the cargo;
   wherein:
   each said portable monitoring device is configured to be operable for sending and/or sharing status information for the individual corresponding purchase order after delivery at a final destination; and
   the system includes a portable scanning device configured such that after the status information for the individual corresponding purchase order is sent and/or shared via the portable monitoring device, the portable scanning device is operable for:
     scanning a wireless serial number, a shipping serial container code (SSCC) label(s) on the pallet(s), and the pallet temperature performance tag(s);
     scanning the control box temperature performance tag in the control box for the individual corresponding purchase order; and
     generating an alert if the scanned pallet temperature performance tag(s) indicate that any pallet(s) experienced any temperature excursion during transit.

2. The system of claim 1, wherein the portable scanning device comprises one or more of a camera on a smartphone, an infrared scanner, a Bluetooth (BT) device, a near field communication (NFC) device, and/or a radio-frequency identification (RFID) device.

3. The system of claim 1, wherein each said portable monitoring device is configured to be operable for automatically sending and/or sharing status information for the individual corresponding purchase order after arrival of the cargo at a destination, the status information including whether:
   the individual corresponding purchase order experienced any temperature excursion during transit; or the individual corresponding purchase order remained within an allowable temperature/time range and therefore did not experience any temperature excursion during transit.

4. A system for quality monitoring of a pallet(s) of goods in a cargo during transit, the system comprising:
one or more pallet temperature performance tags, each said pallet temperature performance tag configured to be coupled with a corresponding one of the pallet(s) of goods in the cargo and operable for indicating that the individual corresponding pallet has experienced any temperature excursion event;
one or more portable monitoring devices, each said portable monitoring device configured to be coupled with a corresponding purchase order in the cargo and operable for indicating that the cargo, including the pallet(s) of goods, of the individual corresponding purchase order has experienced any temperature excursion event;
one or more control box temperature performance tags, each said control box temperature performance tag configured to be positioned within a corresponding control box for each purchase order in the cargo and operable for indicating that the goods within the individual corresponding control box have experienced any temperature excursion event; and
one or more pallet level shipping labels including shipping information, each said pallet level shipping label configured to be coupled with a corresponding one of the pallet(s) of goods in the cargo;
wherein:
the system includes a portable scanning device configured such that when the portable monitoring device for the individual corresponding purchase order indicates that an allowable temperature/time range was not exceeded for the individual corresponding purchase order, the portable scanning device is operable for scanning the pallet temperature performance tag(s) applied to the pallet(s) to determine whether the pallet(s) exceeded an allowable pallet temperature/time range;
the system is configured to allow a pulp/inspection of a reduced sample size to determine whether or not to accept the full or partial purchase order when all of the pallet temperature performance tag(s) indicate that the pallet(s) did not exceed the allowable pallet temperature/time range;
the portable scanning device configured such that when any of the pallet temperature performance tag(s) indicate that any of the pallet(s) exceeded the allowable pallet temperature/time range, the portable scanning device is operable for scanning the control box temperature performance tag of the control box to determine if the control box exceeded an allowable control box temperature/time range, and
if the control box temperature performance tag indicates that the control box did not exceed the allowable control box temperature/time range, the system is configured to allow a pulp/inspection of a reduced sample size to determine whether or not to accept the full or partial purchase order; and
if the control box temperature performance tag indicates that the control box exceeded the allowable control box temperature/time range, the system is configured to allow a pulp/inspection of an increased sample size to determine whether or not to accept the full or partial purchase order.

5. The system of claim 4, wherein:
each said portable monitoring device is configured to be operable for sending and/or sharing status information for the individual corresponding purchase order after delivery at a final destination; and
the system includes a portable scanning device configured such that after the status information for the individual corresponding purchase order is sent and/or shared via the portable monitoring device, the portable scanning device is operable for:
scanning a wireless serial number, a shipping serial container code (SSCC) label(s) on the pallet(s), and the pallet temperature performance tag(s);
scanning the control box temperature performance tag in the control box for the individual corresponding purchase order; and
generating an alert if the scanned pallet temperature performance tag(s) indicate that any pallet(s) experienced any temperature excursion during transit.

6. The system of claim 4, wherein the system includes a portable scanning device configured such that after the status information is sent and/or shared for the individual corresponding purchase order via the portable monitoring device, the portable scanning device is operable for:
scanning a wireless serial number, a shipping serial container code (SSCC) label(s) on the pallet(s), and the pallet temperature performance tag(s);
scanning the control box temperature performance tag in the control box for the individual corresponding purchase order; and
generating an alert if the scanned pallet temperature performance tag(s) indicate that any pallet(s) experienced any temperature excursion during transit.

7. A system for quality monitoring of a pallet(s) of goods in a cargo during transit, the system comprising:
one or more pallet temperature performance tags, each said pallet temperature performance tag configured to be coupled with a corresponding one of the pallet(s) of goods in the cargo and operable for indicating that the individual corresponding pallet has experienced any temperature excursion event;
one or more portable monitoring devices, each said portable monitoring device configured to be coupled with a corresponding purchase order in the cargo and operable for indicating that the cargo, including the pallet(s) of goods, of the individual corresponding purchase order has experienced any temperature excursion event;
one or more control box temperature performance tags, each said control box temperature performance tag configured to be positioned within a corresponding control box for each purchase order in the cargo and operable for indicating that the goods within the individual corresponding control box have experienced any temperature excursion event; and
one or more pallet level shipping labels including shipping information, each said pallet level shipping label configured to be coupled with a corresponding one of the pallet(s) of goods in the cargo;
wherein:
the system includes a portable scanning device configured such that when the portable monitoring device for the individual corresponding purchase order indicates that an allowable temperature/time range was exceeded for the individual corresponding purchase order, the portable scanning device is operable for scanning the pallet temperature performance tag(s) applied to the pallet(s)

to determine whether the pallet(s) exceeded an allowable pallet temperature/time range;

the system is configured to allow a pulp/inspection of a reduced sample size to determine whether or not to accept the full or partial purchase order when all of the pallet temperature performance tag(s) indicate that the pallet(s) did not exceed the allowable pallet temperature/time range;

the portable scanning device configured such that when any of the pallet temperature performance tag(s) indicate that any of the pallet(s) exceeded the allowable pallet temperature/time range, the portable scanning device is operable for scanning the control box temperature performance tag of the control box to determine if the control box exceeded an allowable control box temperature/time range, and if the control box temperature performance tag indicates that the control box did not exceed the allowable control box temperature/time range, the system is configured to allow a pulp/inspection of a reduced sample size to determine whether or not to accept the full or partial purchase order; and if the control box temperature performance tag indicates that the control box exceeded the allowable control box temperature/time range, the system is configured to allow a pulp/inspection of a reduced sample size and the full purchase order is rejected.

8. A system for quality monitoring of a pallet(s) of goods in a cargo during transit, the system comprising:

one or more pallet temperature performance tags, each said pallet temperature performance tag configured to be coupled with a corresponding one of the pallet(s) of goods in the cargo and operable for indicating that the individual corresponding pallet has experienced any temperature excursion event;

one or more portable monitoring devices, each said portable monitoring device configured to be coupled with a corresponding purchase order in the cargo and operable for indicating that the cargo, including the pallet(s) of goods, of the individual corresponding purchase order has experienced any temperature excursion event;

one or more control box temperature performance tags, each said control box temperature performance tag configured to be positioned within a corresponding control box for each purchase order in the cargo and operable for indicating that the goods within the individual corresponding control box have experienced any temperature excursion event; and one or more pallet level shipping labels including shipping information, each said pallet level shipping label configured to be coupled with a corresponding one of the pallet(s) of goods in the cargo;

wherein the system is configured to be operable for:

receiving a purchase order shipment without requiring any quality control when the portable monitoring device for the purchase order and all of the pallet temperature performance tag(s) of the pallet(s) of the purchase order indicate that the allowable temperature/time range was not exceeded and the purchase order shipment did not experience any temperature excursion;

requiring reduced quality control for a purchase order shipment when the portable monitoring device for the purchase order indicates that the allowable temperature/time range was not exceeded but at least one, but not all, of the pallet temperature performance tag(s) of the pallet(s) of the purchase order indicate that the allowable temperature/time range was exceeded;

requiring reduced quality control for a purchase order shipment when the portable monitoring device for the purchase order indicates that the allowable temperature/time range was exceeded but at least one, but not all, of the pallet temperature performance tag(s) of the pallet(s) of the purchase order indicate that the allowable temperature/time range was not exceeded; and rejecting a purchase order shipment without requiring any quality control when the portable monitoring device for the purchase order and all of the pallet temperature performance tag(s) of the pallet(s) of the purchase order indicate that the allowable temperature/time range was exceeded and the purchase order shipment experienced any temperature excursion.

9. The system of claim 1, further comprising an oversight cloud or cloud-based online portal, and wherein the system is configured to upload information to the oversight cloud or cloud-based online portal including information from the one or more pallet temperature performance tags, the one or more portable monitoring devices, the one or more control box temperature performance tags, and the one or more pallet level shipping labels.

10. The system of claim 9, wherein the system is configured such that the information uploaded to the oversight cloud or cloud-based online portal is usable for reporting and analysis to thereby enable end-to-end cold chain visibility, identification of unreliable participant(s) in the cold chain, and/or a specific assessment of quality of a shipment on the pallet(s) of goods by pallet level and on a level by level of the pallet(s) of goods.

11. The system of claim 9, wherein the system is configured to track and upload the information to the oversight cloud or cloud-based online portal for each order that is loaded or unloaded during a shipment, and/or wherein the oversight cloud or cloud-based online portal is configured to be operable for sending the information to a customer cloud via an Application Programming Interface (API) network.

12. The system of claim 1, wherein the information from the one or more pallet temperature performance tags, the one or more portable monitoring devices, the one or more control box temperature performance tags, and the one or more pallet level shipping labels enable the system to tie individual temperature information for each item on the pallet(s) of goods to overall temperature information for a shipment, which is tied to one or more of a purchase order number, supplier information, and customer information, whereby tying of the individual temperature information to the overall temperature information enables determination as to whether items of the purchase order in the shipment remain usable if the overall temperature information indicates that all items in the shipment should otherwise be discarded.

13. The system of claim 1, wherein the system includes a software application (an App) on a mobile device configured to remotely store and monitor information of the goods including information from the one or more pallet temperature performance tags, the one or more portable monitoring devices, the one or more control box temperature performance tags, and the one or more pallet level shipping labels.

14. The system of claim 1, wherein the one or more pallet temperature performance tags include a chemical indicator configured for visibly indicating temperature information and/or temperature change occurrences by color changes.

15. The system of claim 14, wherein the chemical indicator includes:

a first portion configured to change to a first color to visibly indicate that the pallet temperature performance tag did not exceed a first temperature/time range or a second temperature/time range;

a second portion configured to change to a second color, different than the first color, to indicate that the pallet temperature performance tag exceeded the first temperature/time range but the pallet temperature performance tag did not exceed the second temperature/time range; and a third portion configured to change to a third color, different than the first and second colors, to indicate that the pallet temperature performance tag exceeded the second temperature/time range.

16. The system of claim 15, wherein the chemical indicator is configured such that both the second and third portions of the chemical indicator change to their respective second and third colors to indicate a dual temperature excursion of the pallet temperature performance tag.

17. The system of claim 14, wherein the one or more pallet temperature performance tags include a removable portion or pull-tab configured to be removed by a user to thereby activate the chemical indicator, whereby removal of the removable portion or pull-tab visibly indicates that the chemical indicator has been activated.

18. The system of claim 1, wherein the one or more portable monitoring devices are configured to be operable for providing historical data of temperature, date(s) and time(s) of temperature excursion events, traceability for purchase orders and performance indicators, and/or for keeping track of cold chain shipments with real-time temperature, location, and security data.

19. The system of claim 1, further comprising a portable scanning device configured to be operable for scanning the one or more pallet temperature performance tags, the one or more portable monitoring devices, and the one or more control box temperature performance tags to thereby determine and visibly indicate whether the scanned pallet temperature performance tag, portable monitoring device, or control box temperature performance tag has not exceeded an allowable temperature/time range, has exceeded the allowable temperature/time range thereby indicating a possible temperature excursion, or has not been activated.

20. The system of claim 19, wherein the portable scanning device comprises one or more of a camera on a smartphone, an infrared scanner, a Bluetooth (BT) device, a near field communication (NFC) device, and/or a radio-frequency identification (RFID) device.

21. The system of claim 19, wherein the portable scanning device is configured to be operable for uploading information to an oversight cloud or cloud-based online portal including information scanned from the one or more pallet temperature performance tags, the one or more portable monitoring devices, the one or more control box temperature performance tags, and the one or more pallet level shipping labels.

22. The system of claim 1, wherein the one or more portable monitoring devices comprise one or more of a wireless radio frequency (RF) tracker, logger, recorder, or Internet of Things (IoT) device.

23. The system of claim 1, wherein the one or more pallet level shipping labels include a shipping serial container code (SSCC).

* * * * *